United States Patent
Lloyd et al.

(10) Patent No.: US 8,694,892 B2
(45) Date of Patent: Apr. 8, 2014

(54) METHOD AND SYSTEM FOR CACHING OF NON-REAL TIME DATA

(75) Inventors: Stratton C. Lloyd, Seattle, WA (US); Quoc Tai Tran, Mountain View, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1194 days.

(21) Appl. No.: 10/749,861

(22) Filed: Dec. 31, 2003

(65) Prior Publication Data

US 2007/0198920 A1 Aug. 23, 2007

Related U.S. Application Data (60) Provisional application No. 60/528,247, filed on Dec. 9, 2003.

(51) Int. Cl.
*G06F 3/00* (2006.01)
*G06F 13/00* (2006.01)

(52) U.S. Cl.
USPC ............................ 715/738; 711/118; 711/133

(58) Field of Classification Search
USPC ......... 715/234, 742, 760, 764, 738, 771, 772; 705/10, 11; 711/118, 135, 133; 709/217
See application file for complete search history.

(56) References Cited

U.S. PATENT DOCUMENTS

| | | | |
|---|---|---|---|
| 6,763,388 B1 * | 7/2004 | Tsimelzon | 709/228 |
| 7,051,084 B1 * | 5/2006 | Hayton et al. | 709/219 |
| 7,082,403 B2 * | 7/2006 | Wagner et al. | 705/8 |
| 7,168,045 B2 * | 1/2007 | Fliess et al. | 715/771 |
| 7,188,216 B1 * | 3/2007 | Rajkumar et al. | 711/118 |
| 7,231,496 B2 * | 6/2007 | Curtis | 711/137 |
| 7,346,843 B2 * | 3/2008 | Hind et al. | 715/234 |
| 2002/0010753 A1 * | 1/2002 | Matsuoka et al. | 709/217 |
| 2004/0104947 A1 * | 6/2004 | Schmitt | 345/859 |
| 2004/0128618 A1 * | 7/2004 | Datta | 715/513 |

OTHER PUBLICATIONS

U.S. Appl. No. 60/433,408 of Rajkumar, dated Dec. 13, 2002, 60433408.pdf, 189 pages.*

* cited by examiner

*Primary Examiner* — Haoshian Shih
(74) *Attorney, Agent, or Firm* — Campbell Stephenson LLP (57) ABSTRACT

A method and system for generating and presenting a display page before all the desired computations are performed needed to fully populate the display page. The presentation system receives a request to present the display page that includes realtime information and non-realtime information. When generating a display page including both realtime and non-realtime information, the presentation system retrieves the realtime information and requests that the non-realtime information be generated. The presentation system then creates an initial display page that includes the realtime information along with an indication that the generation of the non-realtime information has been requested. When the presentation system next generates that display page, it checks whether the non-realtime information has been generated. If so, the presentation system adds the realtime information and non-realtime information to the display page.

37 Claims, 11 Drawing Sheets

METHOD AND SYSTEM FOR CACHING OF NON-REAL TIME DATA

CROSS REFERENCE TO RELATED APPLICATIONS

This application claims the benefit of provisional U.S. Patent Application No. 60/528,247, filed Dec. 9, 2003, which is hereby incorporated by reference in its entirety.

TECHNICAL FIELD

The described technology relates generally to caching of information and particularly to caching of information that is included on web pages.

BACKGROUND

Many organizations need to track the business opportunities of their sales force. By tracking various business opportunities, an organization can forecast business statistics such as revenue and product quantities based on those opportunities. In addition, organizations generally would like to monitor how their actual revenue relates to their forecasted revenue based on actual-to-forecasted business statistics. By monitoring actual revenue, an organization can determine whether it is on track to meet its forecasted revenue. If it is not on track, then the organization can take appropriate actions.

Traditionally, each salesperson in an organization would need to define reports containing the information needed to analyze their forecasted revenues. Depending on the complexity of the reports, it may take considerable time for a computer system to perform the computation necessary to generate the reports. When a salesperson submits a request to run a report, the resulting report may be displayed to the salesperson only after the report is completely generated. In the meantime, the salesperson may be stuck waiting for the report. Moreover, the report may provide only a small part of the information needed by a salesperson to analyze their forecasted revenues. For example, a report may list aggregate forecasted revenue by each region with an organization. A sales manager may not only want to review the aggregate forecasted revenue but also simultaneously review opportunity information of certain salespersons. When a report includes graphical information, a salesperson may want to analyze the underlying data used to generate the graphical information. To accomplish that analysis, the salesperson may need to define a new report for the needed information.

It would be desirable to have a system that would provide a salesperson a comprehensive view of the information needed to analyze their business opportunities, to allow the salesperson to drill down into the supporting details, and to provide the information in a way not unduly delayed by computations that take a considerable amount of time.

DETAILED DESCRIPTION

A method and system for generating and presenting a display page before all the desired computations are performed needed to fully populate the display page is provided. In one embodiment, the presentation system receives a request to present the display page (e.g., web page) that includes realtime information and non-realtime information. Realtime information refers to the information that can be quickly retrieved or generated so that the presentation system can include the information on the display page without significant delay in presenting of the display page to a user. Non-realtime information, in contrast, refers to information that cannot be quickly retrieved or generated so that the presentation system would need to significantly delay presenting the display page to a user. One skilled in the art will appreciate that what is realtime information and what is non-realtime information can vary depending upon the acceptable level of delay in presenting a display page. For example, in some contexts, a one-second delay may be unacceptable, while in other contexts a five-second delay may be acceptable. An example of realtime information may be information retrieved from a single record of a transactional database or a data warehouse and displayed with little or no computation being performed. An example of non-realtime information may be information aggregated from multiple records of a transactional database or a data warehouse. Another example of non-realtime information may be "analytics," which refers to various algorithms for processing information that may be computationally expensive. A display page that includes realtime information along with the results of such analytics is referred to as having "embedded analytics." When generating a display page including both realtime and non-realtime information, the presentation system retrieves the realtime information and requests that the non-realtime information be generated. The presentation system then creates an initial display page that includes the realtime information along with an indication that the generation of the non-realtime information has been requested. When the presentation system next generates that display page, it checks whether the non-realtime information has been generated. If so, the presentation system adds the realtime information and non-realtime information to the display page. In one embodiment, when the non-realtime information has not yet been generated, the presentation system adds a link to the display page that, when selected by the user, requests the presentation system to update the display page with the non-realtime information when generated. In this way, a user can view their realtime information without having to wait for the generation of the non-realtime information.

In one embodiment, the presentation system allows a user to interactively drill down to view the underlying information used to generate the embedded analytics. For example, if the embedded analytics is presented as a pie chart, the presentation system will allow a user to select a piece of the pie and display the underlying information of the selected piece. The presentation system may present the underlying information within the same subarea of the display page or may generate a new display page that contains the underlying information. The presentation system may also allow a user or any administrator to define a "dashboard" view into information that is deemed important for the user to view. For example, the dashboard view may include an area listing current leads of a salesperson, another area listing active opportunities of the salesperson, and so on. The dashboard may include user-specific information (e.g., opportunity information). A sales manager may specify what information to include on the dashboard of their reporting salespersons. In this way, a salesperson will have access to supporting details and information that the sales manager may think is important for salesperson to view.

Figure 1:
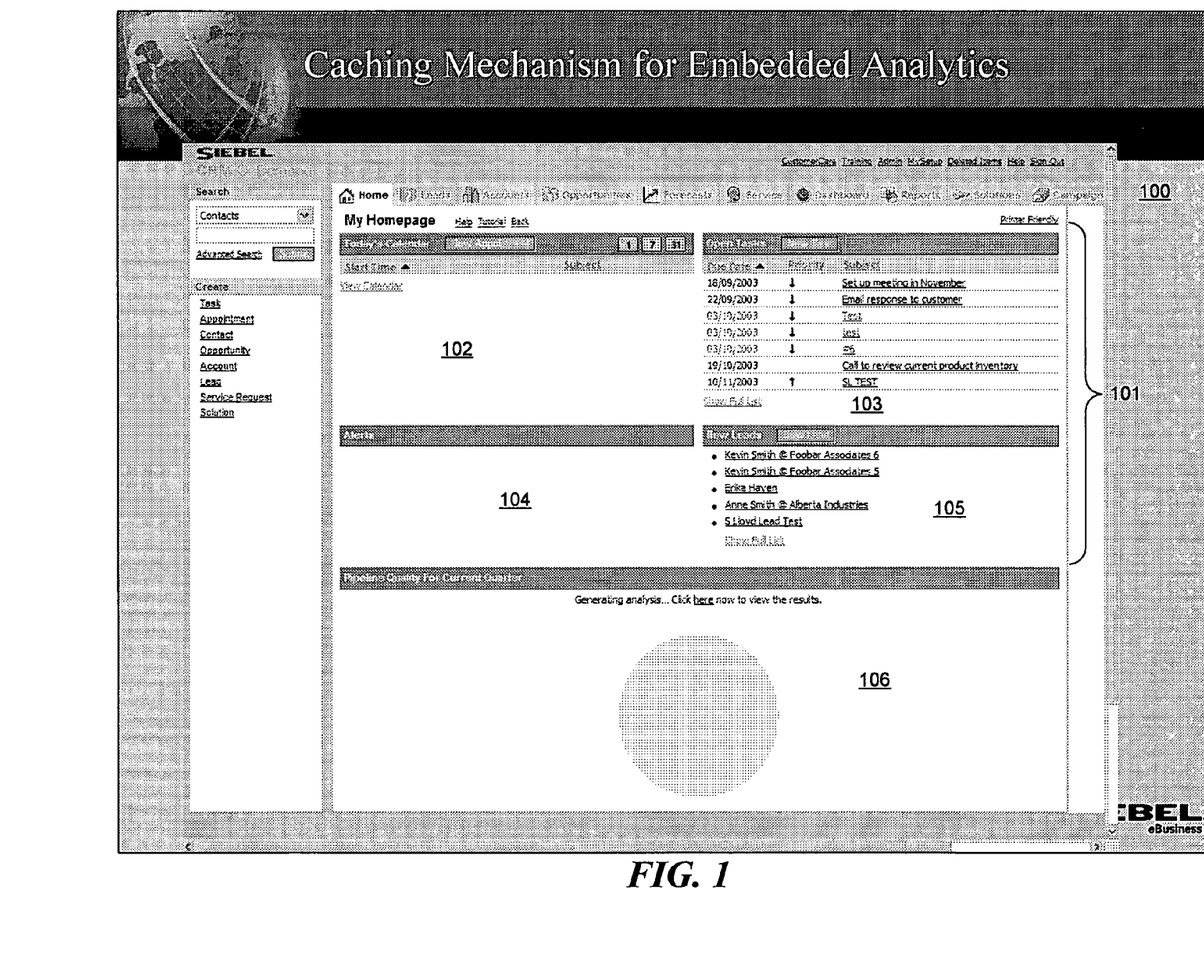
FIG. 1 is an example display page that contains realtime information and indication that the non-realtime information is not yet ready to be displayed.

FIG. 1 is an example display page that contains realtime information and indication that the non-realtime information is not yet ready to be displayed. The display page 100 includes a realtime information area 101 and a non-realtime information area 106. The realtime information area includes a calendar area 102, an open task area 103, an alerts area 104, and a new leads area 105. The calendar area contains calendar information that may be retrieved from a calendar database. The open task area includes an entry for each open task of the user retrieved from a task table. The alerts area includes information describing various alert notifications that the user has received. The new leads area contains an entry for each new lead and may be retrieved from a leads table of a database. The non-realtime area includes a link indicating that non-realtime information has not yet been generated. When a user selects the link, the presentation system determines whether the non-realtime information has already been generated and if so includes it on the display page.

Figure 2:
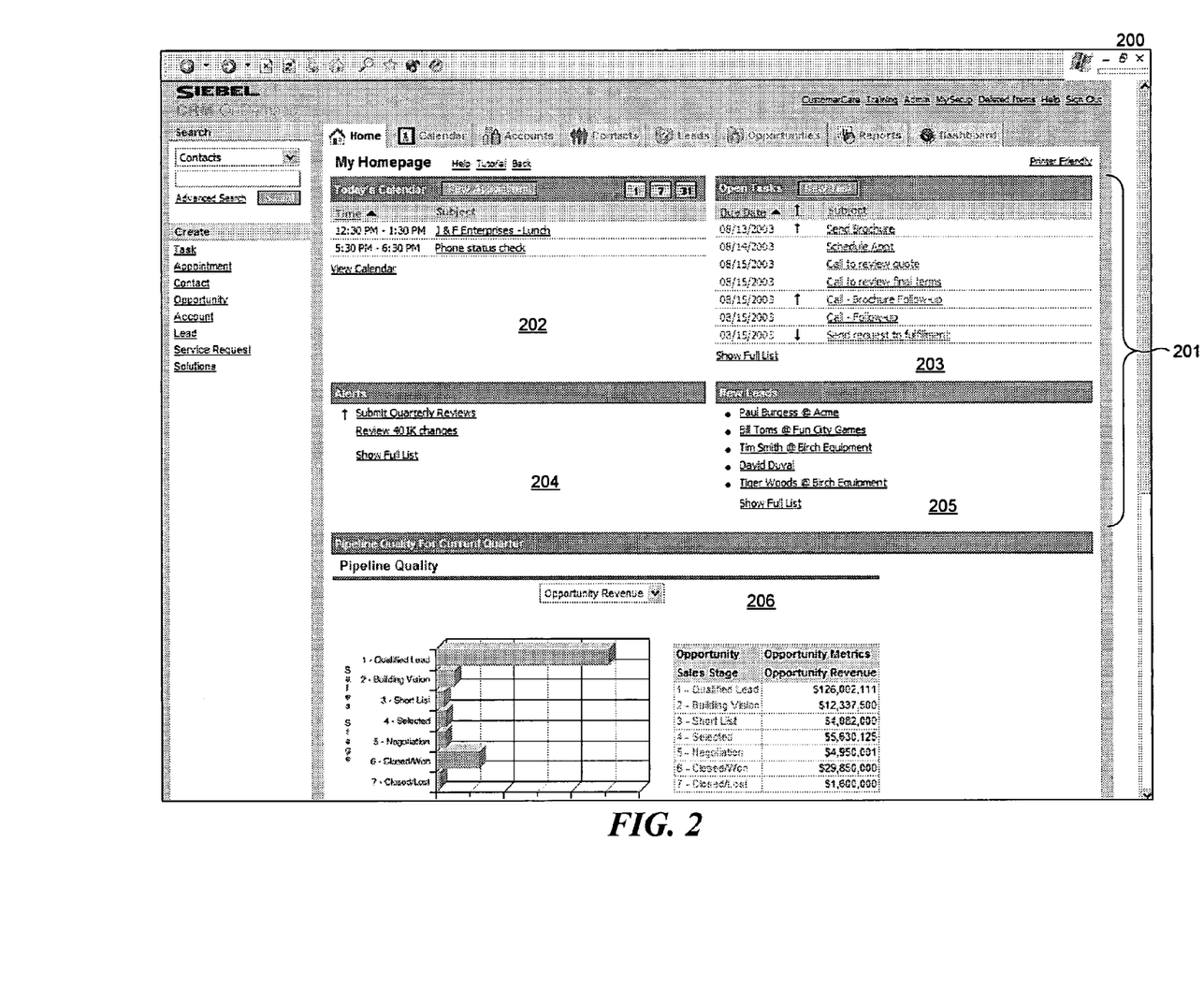
FIG. 2 is an example display page that contains realtime information and non-realtime information that has already been generated.

FIG. 2 is an example display page that contains realtime information and non-realtime information that has already been generated. The display page 200 includes a realtime information area 201 and a non-realtime information area 206. The realtime information area contains areas corresponding to those of FIG. 1. The non-realtime information area includes the embedded analytics that was generated in between the request for the previous display page and the request for this display page.

Figure 3:
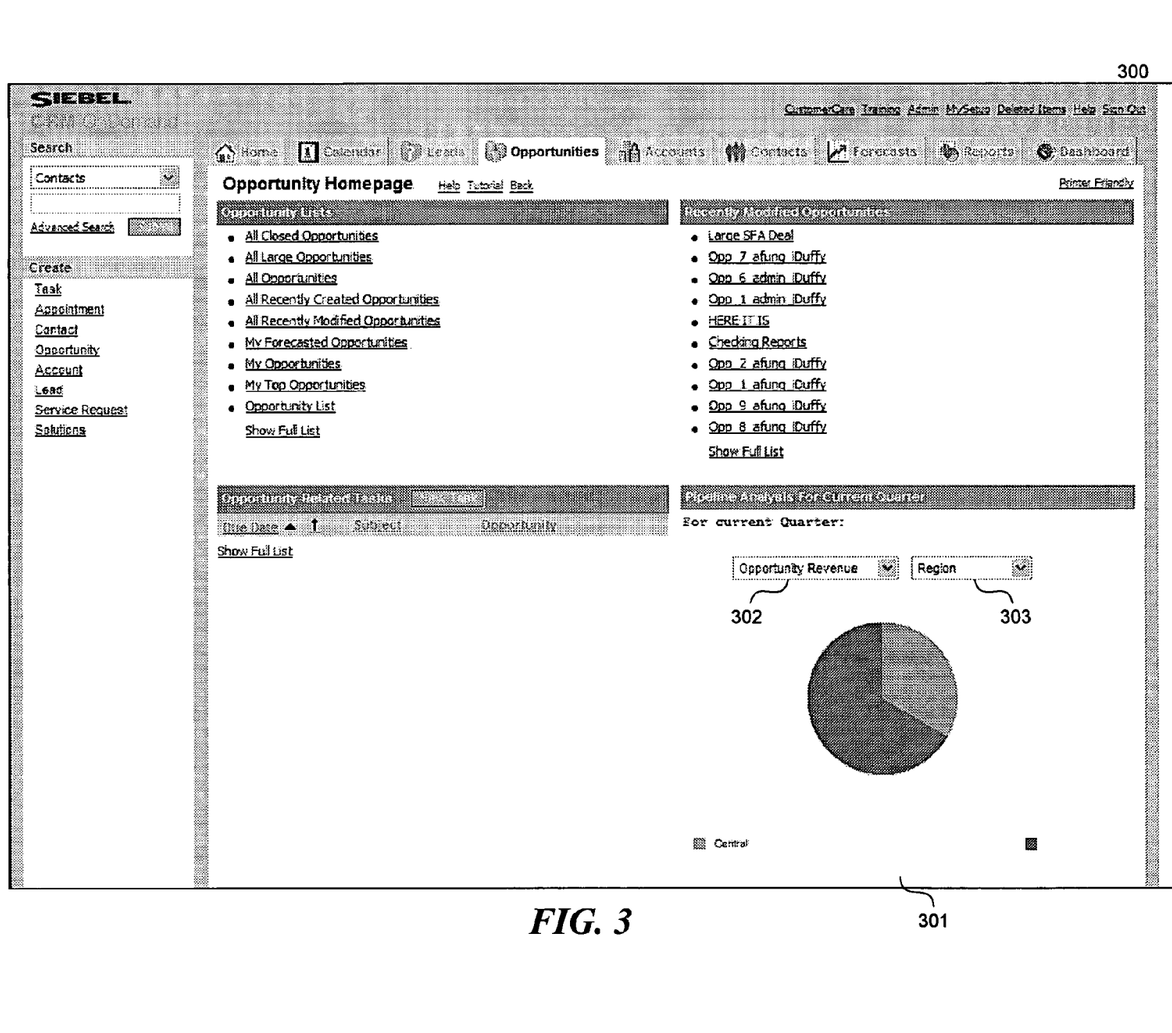
FIG. 3 is an example display page that contains an embedded analytics for which a user can retrieve underlying information.

FIG. 3 is an example display page that contains embedded analytics for which a user can retrieve underlying information. The display page 300 includes the embedded analytics area 301. In this example, the embedded analytics is represented as a pie chart 301. In addition, the display page includes drop-down list 302 and drop-down list 303. Drop-down list 302 allows a user to select the underlying data for the pie chart. Drop-down list 303 allows a user to select the sales region the pie chart represents. The presentation system may also allow a user to select a piece of the pie to view more detailed information.

Figure 4:
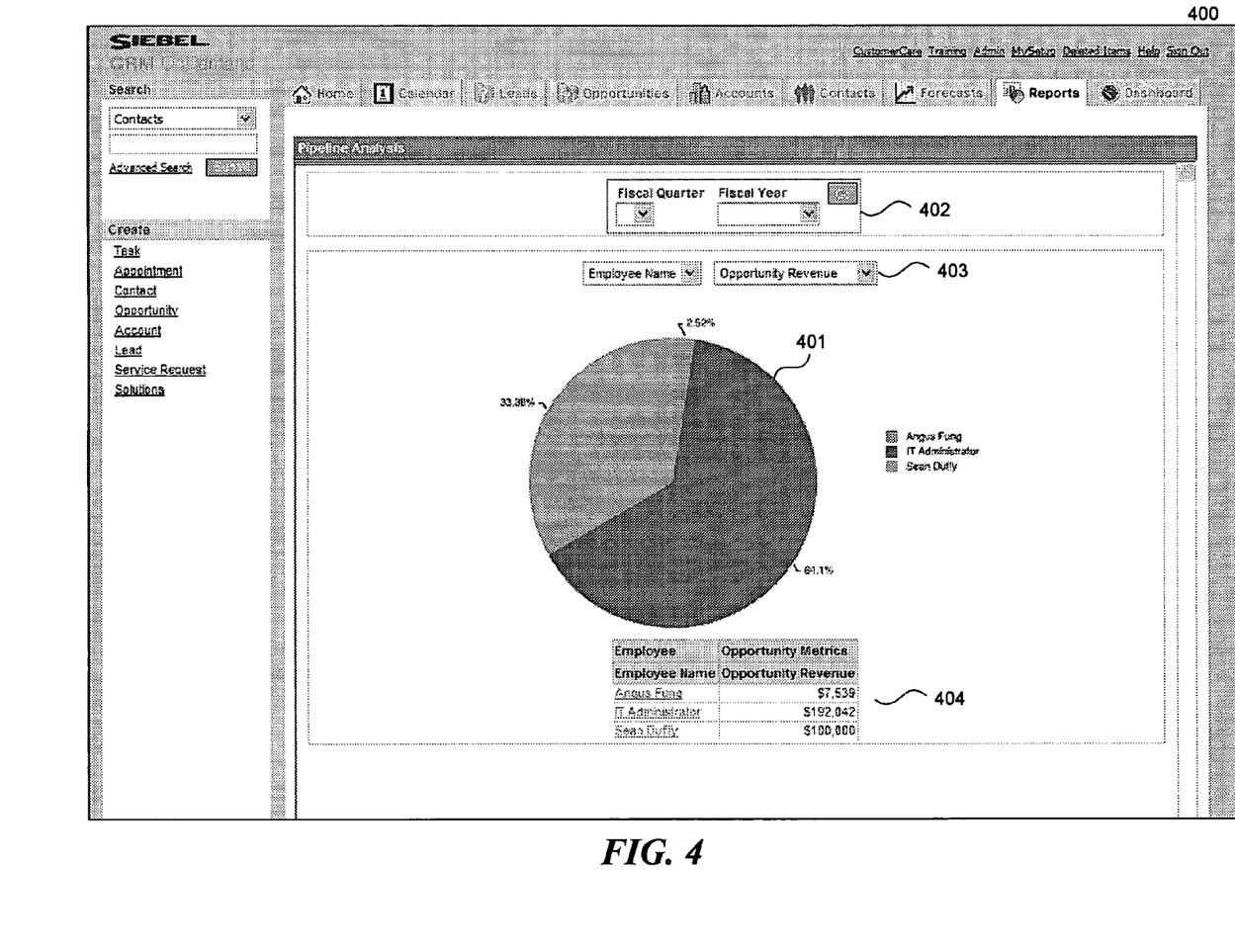
FIG. 4 is an example display page that contains more detailed information about an embedded analytics.

FIG. 4 is an example display page that contains more detailed information about the embedded analytics. The display page 400 includes a pie chart 401, a select period area 402, and drop-down lists 403. The select period area allows a user to specify the period that the embedded analytics should cover. Drop-down lists 403 allow a user to specify the underlying data used to generate the pie chart. The table 404 presents the pie chart information in tabular format.

Figure 5:
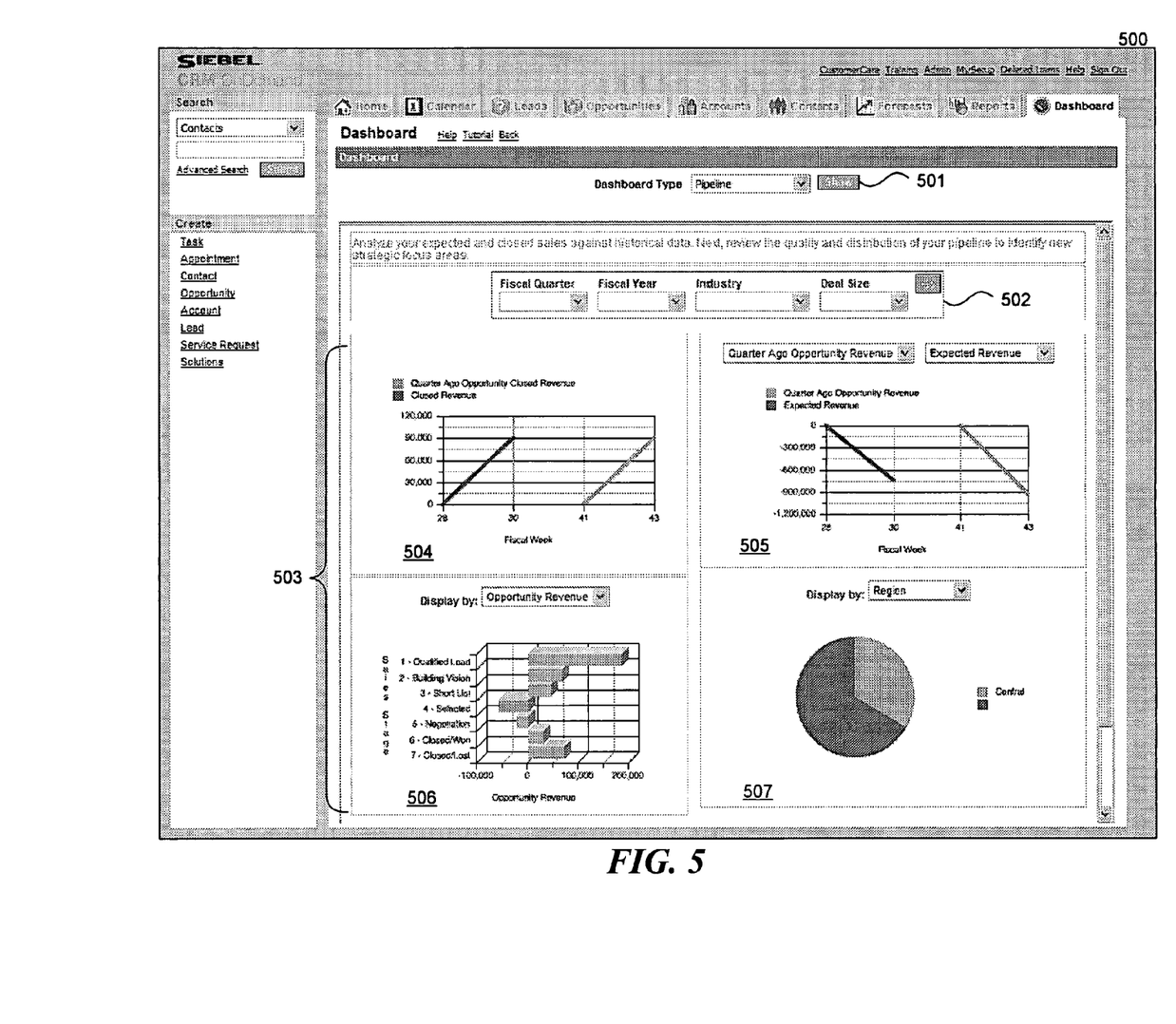
FIG. 5 is an example display page that illustrates a dashboard in one embodiment.

FIG. 5 is an example display page that illustrates a dashboard in one embodiment. The display page 500 includes a dashboard type area 501, a selection area 502, and the embedded analytics area 503. The dashboard type area includes a drop-down list so that a user can select the type of dashboard to be displayed. For example, one dashboard type may relate to pipeline revenue and another dashboard type may relate to closed revenue. The information of the dashboard relates to the selected type. The selection area includes drop-down lists for specifying a selection criteria of information to be displayed in the dashboard. In this example, the selection area includes a fiscal quarter, a fiscal year, an industry, and a deal size drop-down list. The embedded analytics area includes subareas 504-507. Each subarea presents embedded analytics related to the dashboard type and selection criteria. Each subarea may also include drop-down lists to further refine the information to be displayed in the subarea.

Figure 6:
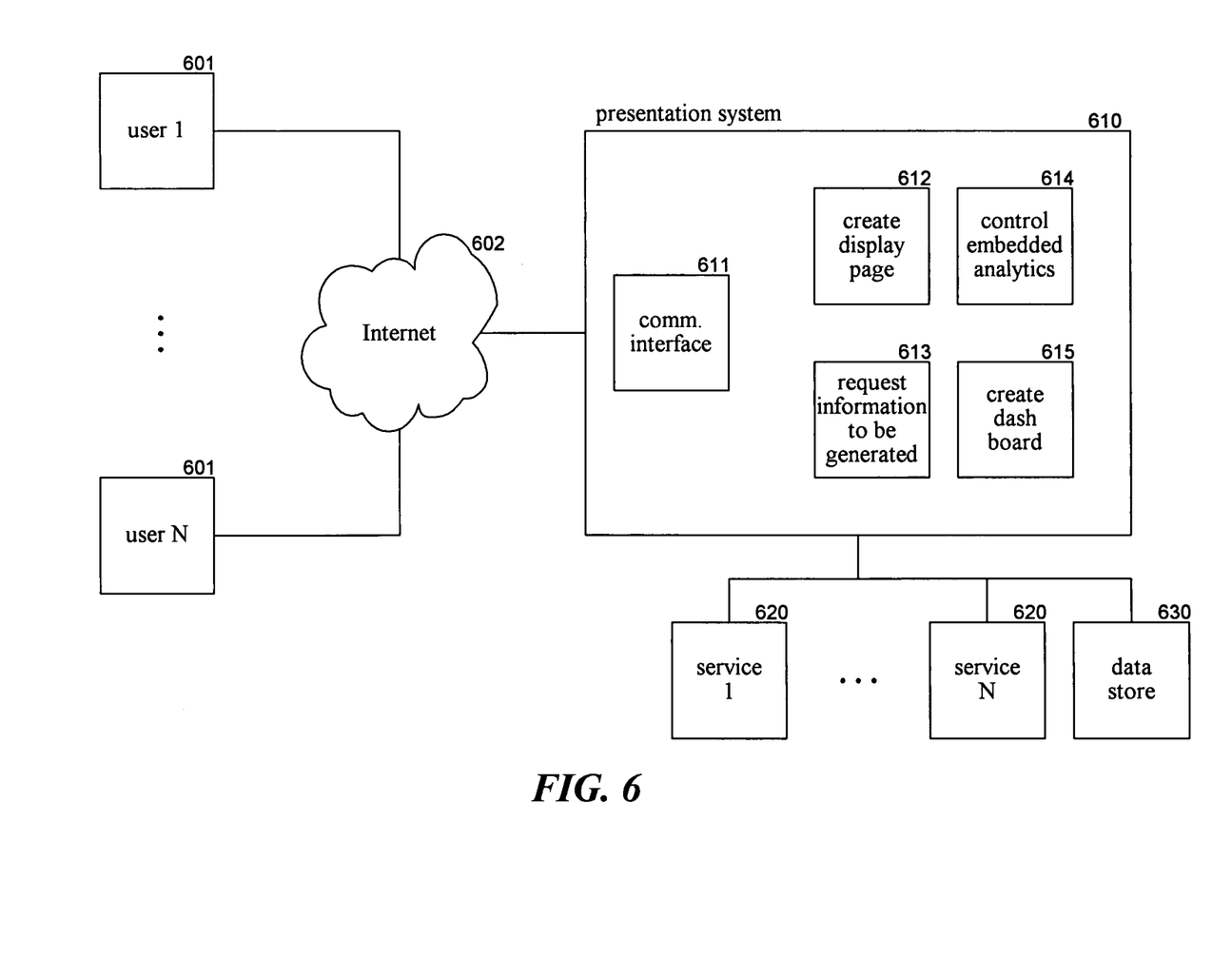
FIG. 6 is a block diagram illustrating components of the presentation system in one embodiment.

FIG. 6 is a block diagram illustrating components of the presentation system in one embodiment. The presentation system 610 is connected to user computer systems 601 via a communications link 602 such as the Internet. In one embodiment, the user computer systems access the presentation system via a conventional web browser. The presentation system includes a communications interface 611 for receiving requests from user computer systems and sending responses to the user computer systems. The presentation system also includes a create display page component 612, a request information to be generated component 613, a control embedded analytics component 614, and a create dashboard component 615. The presentation system is also connected to services 620 and data store 630. The create display page component creates display pages that include realtime and non-realtime information including the appropriate indication if the non-realtime information is not yet ready to be displayed. The request information to be generated component requests a service to generate the non-realtime information and stores the non-realtime information in a cache for use by the create display page component. The control embedded analytics component allows a user to drill down to view the underlying information related to the embedded analytics. The create dashboard component creates a dashboard for a user. The dashboard may be customized to the particular user.

The computer systems and servers (e.g., executing the presentation systems) may include a central processing unit, memory, input devices (e.g., keyboard and pointing devices), output devices (e.g., display devices), and storage devices (e.g., disk drives). The memory and storage devices are computer-readable media that may contain instructions that implement the presentation system. In addition, the data structures and message structures may be stored or transmitted via a data transmission medium such as a signal on a communications link. Various communications links may be used, including the Internet, a local area network, a wide area network, or a point-to-point dial-up connection. In one embodiment, the presentation system is implemented on a server that supports multiple organizations, referred to as a multi-tenant environment. In a multi-tenant environment, each user is assigned to an organization and each user can only access the information of their organization. The presentation system may include an organization identifier in each table of its database, or it may maintain a separate database for each organization to help restrict access as appropriate.

Figure 7:
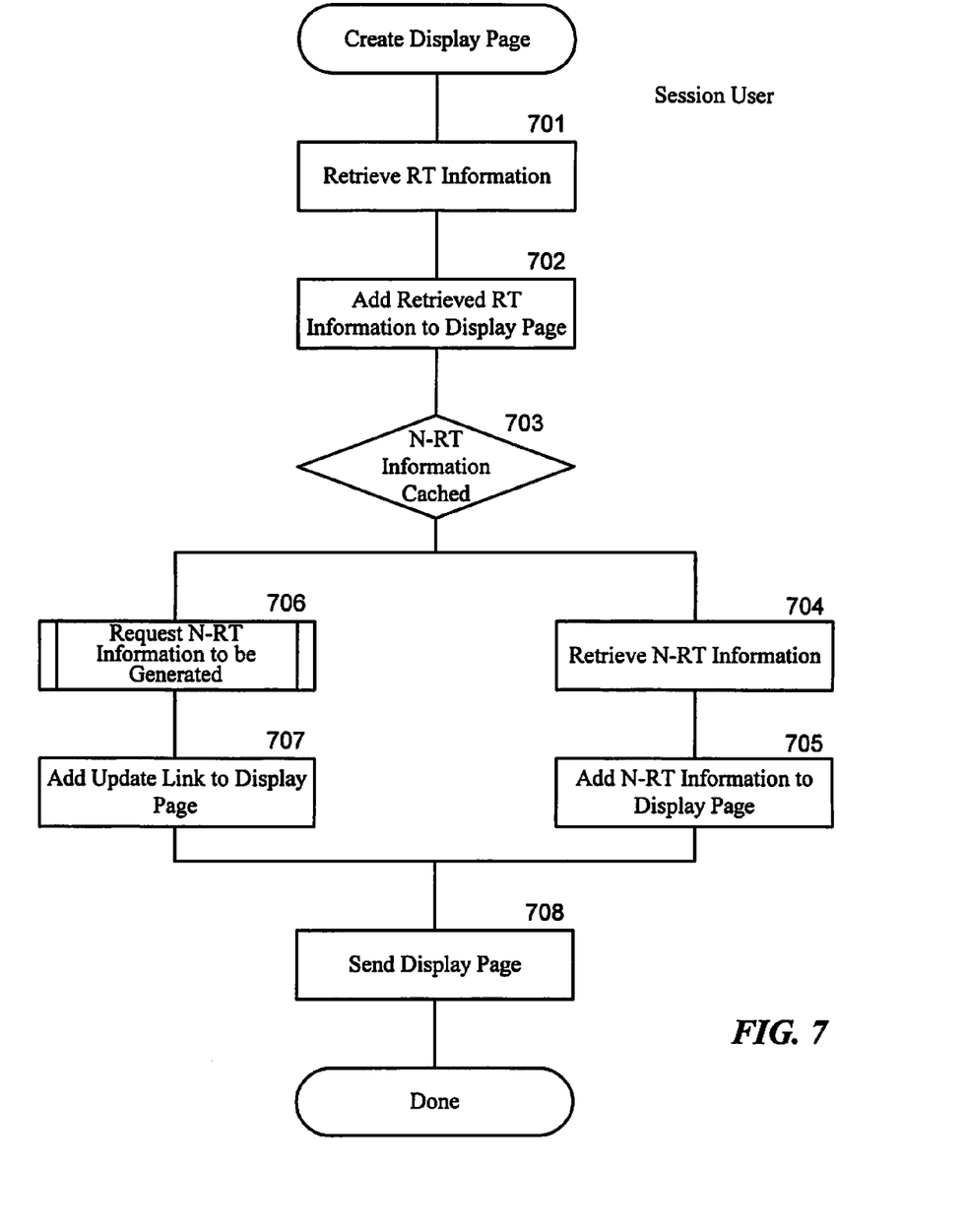
FIG. 7 is a flow diagram illustrating the processing of a create display page component in one embodiment.

FIG. 7 is a flow diagram illustrating the processing of a create display page component in one embodiment. This component is invoked when a request is received from a user to display a display page that includes realtime and non-realtime information. In block 701, the component retrieves the realtime information for the display page. In block 702, the component adds the retrieved realtime information to the display page. In decision block 703, if the non-realtime information has been cached, then the component continues at block 704, else the component continues at block 706. Initially, such as at log on, the non-realtime information will not be cached. In block 704, the component retrieves the non-realtime information from the cache. In block 705, the component adds the retrieved non-realtime information to the display page. In block 706, the component requests a service to generate the non-realtime information. In block 707, the component adds an update link to the display page that a user can select to refresh the non-realtime information. In block 708, the component sends the display page to a user and then completes. This component may be invoked initially to create a homepage when a user first logs on, may be invoked when a user requests specifically to update the non-realtime information, or may be invoked more generally whenever a user navigates to a display page that contains both realtime and non-realtime information. In one embodiment, the component may always request that non-realtime information be generated so that when the display page is next created it can use more current non-realtime information.

Figure 8:
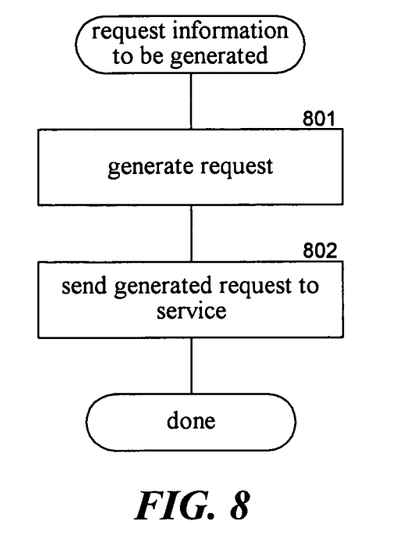
FIG. 8 is a flow diagram illustrating the processing of a request non-realtime information component in one embodiment.

FIG. 8 is a flow diagram illustrating the processing of a request non-realtime information component in one embodiment. In block 801, the component generates a request for the non-realtime information. In block 802, the component sends the generated request to the appropriate service or services to initiate the process of generating the non-realtime information. The component then completes.

Figure 9:
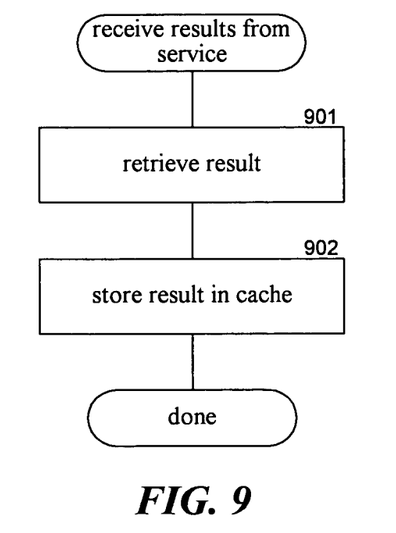
FIG. 9 is a flow diagram illustrating the processing of the receive non-realtime information component in one embodiment.

FIG. 9 is a flow diagram illustrating the processing of the receive non-realtime information component in one embodiment. This component is invoked when the presentation system receives an indication that a service has completed the computation needed to generate the non-realtime information. In block 901, the component retrieves the non-realtime information from the service. In block 902, the component stores the retrieved non-realtime information in a cache and then completes.

Figure 10:
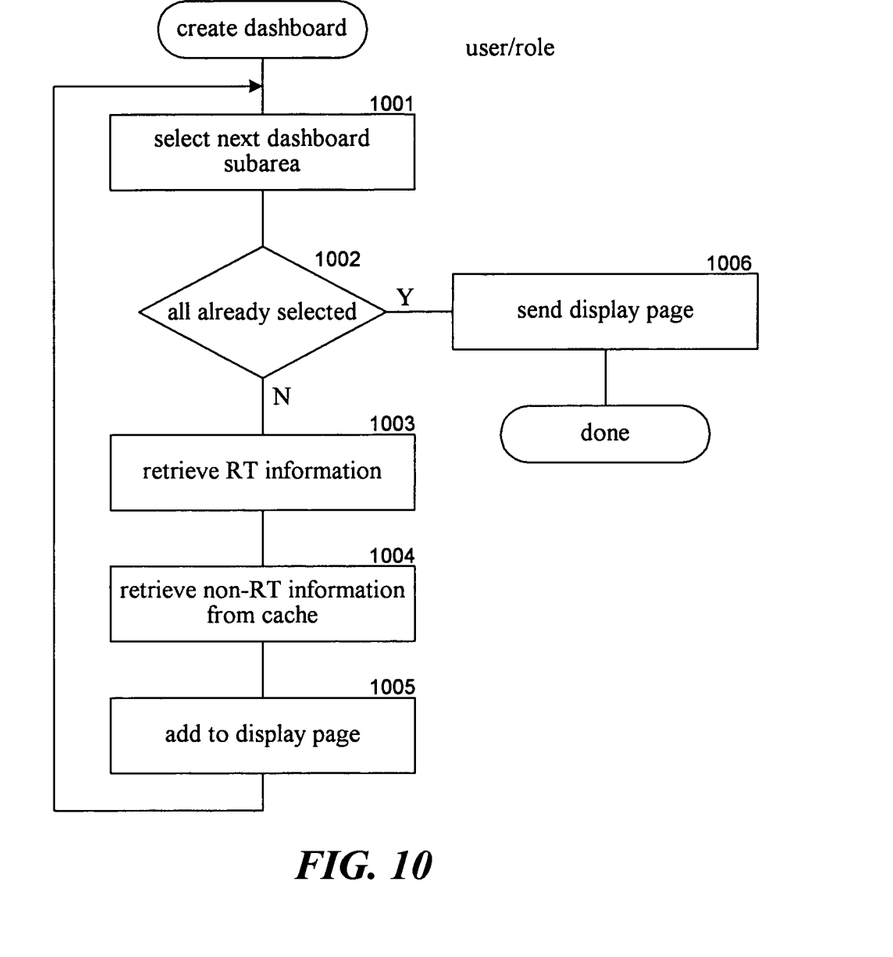
FIG. 10 is a flow diagram illustrating the processing of the create dashboard component in one embodiment.

FIG. 10 is a flow diagram illustrating the processing of the create dashboard component in one embodiment. The component may be passed an indication of a user or a role of a user for whom the dashboard is to be created. In block 1001, the component selects the next subarea of the dashboard. In decision block 1002, if all the subareas have already been selected, then the component continues at block 1006, else the component continues at block 1003. In block 1003, the component retrieves the realtime information for the selected subarea. In block 1004, the component retrieves from the cache any non-realtime information. In block 1005, the component adds the retrieved realtime and non-realtime information to the display page. If the non-realtime information is not yet available, the component may add a link to the selected subarea indicating that the non-realtime information is not yet available. The component then loops to block 1001 to select the next dashboard subarea. In block 1006, the component sends the display page to the user and then completes.

Figure 11:
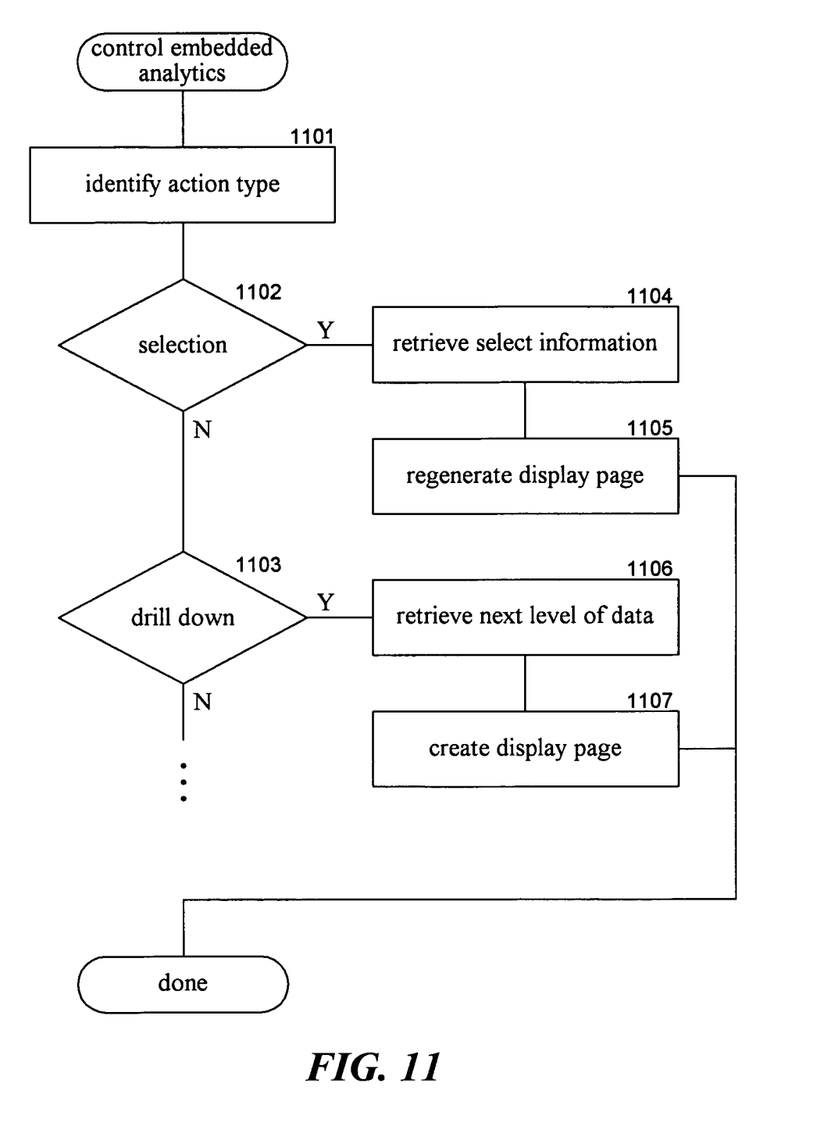
FIG. 11 is a flow diagram illustrating the processing of a control embedded analytics component in one embodiment.

FIG. 11 is a flow diagram illustrating the processing of a control embedded analytics component in one embodiment. The component is invoked when a user requests to take some action relating to the embedded analytics such as contained in a subarea of a dashboard. In block 1101, the component identifies the action the user wants to perform. In decision block 1102, if the action is to specify a selection, then the component continues at block 1104, else the component continues at block 1103. In decision block 1103, if the action specifies to drill down, then the component continues at block 1106, else the component continues to further identify the action and process the action as indicated by the ellipsis. In block 1104, the component retrieves the information related to the selection. In block 1105, the component regenerates the display page and then completes. In block 1106, the component retrieves the next level of data based on the drill-down action. In block 1107, the component creates the display page and then completes.

Figure 12:
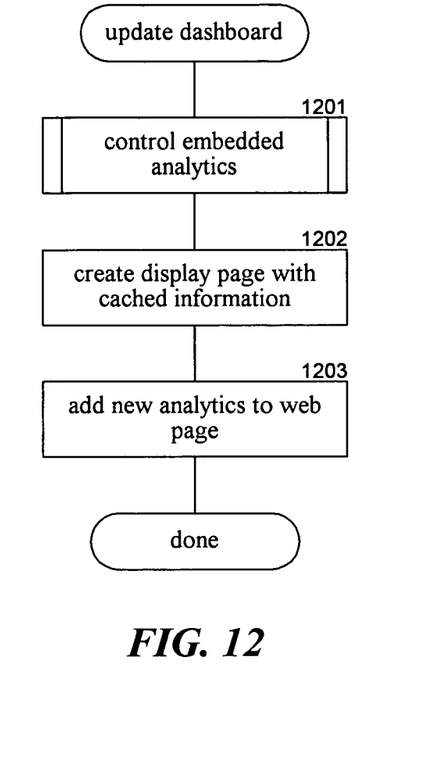
FIG. 12 is a flow diagram illustrating the processing of an update dashboard component in one embodiment.

FIG. 12 is a flow diagram illustrating the processing of an update dashboard component in one embodiment. In block 1201, the component invokes the control embedded analytics component to regenerate embedded analytics of the subareas. In block 1202, the component creates a display page with the cached non-realtime information. In block 1203, the component adds the new analytics to the display page and then completes.

One skilled in the art will appreciate that although specific embodiments of the presentation system have been described herein for purposes of illustration, various modifications may be made without deviating from the spirit and scope of the invention. Accordingly, the invention is not limited except by the appended claims.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computer system, the method comprising:
receiving a request from a user to generate a requested display page, wherein
the requested display page comprises
realtime information, and
non-realtime information,
the realtime information comprises
information displayable without computation to generate the realtime information prior to display, and
the non-realtime information comprises
information requiring computation to generate the non-realtime information prior to display;
retrieving the realtime information to be included on the requested display page;
if a previously cached version of the non-realtime information is available,
generating the requested display page, wherein
the requested display page comprises
the retrieved realtime information, and
the previously cached non-realtime information,
requesting generation of the non-realtime information, wherein
the requesting of the generation is performed subsequent to the generating the requested display page, and
the generation of the non-realtime information produces generated non-realtime information, and
caching the generated non-realtime information as cached generated realtime information, wherein
the cached generated realtime information is configured to be used when generating another instance of the requested display page in response to a subsequent request for the requested display page; and if a previously cached version of the non-realtime information is not available,
generating the requested display page,
requesting the generation of the non-realtime information, and
caching the generated non-realtime information,
and wherein
the requesting of the generation of the non-real-time information is performed if,
the previously cached version of the non-real-time information is available, or
the previously cached version of the non-real-time information is not available.

2. The method of claim 1 wherein the request to generate the requested display page is received when the user logs on to one of the computer system and a client coupled to the computer system.

3. The method of claim 2 wherein the requested display page is a homepage.

4. The method of claim 1 wherein the generated information includes a graphical representation of information.

5. The method of claim 1 further comprising:
drilling down to view underlying information used to generate a selected portion of the requested display page, in response to a request selecting the selected portion of the requested display page, wherein the drilling down comprises
retrieving the underlying information used to generate the selected portion of the requested display page, and
presenting the underlying information by virtue of one of
generating the requested display page comprising the realtime information, the non-realtime information, and the underlying information, and
generating a new display page comprising the underlying information.

6. The method of claim 1 wherein
the requested display page, generated if a previously cached version of the non-realtime information is not available, comprises
the retrieved realtime information, and
an indication that the non-realtime information is not yet ready for display, and
the indication that the non-realtime information is not yet ready for display is provided in a location in which the non-realtime information is to be displayed.

7. The method of claim 6 wherein the generating the requested display page comprising an indication that the non-realtime information is not yet ready for display further comprises:
including a link for requesting the requested display page, wherein the link is configured to refresh the non-realtime information.

8. The method of claim 1 wherein
the generating the requested display page, if a previously cached version of the non-realtime information is not available, further comprises
generating the requested display page in response to a subsequent request for the requested display page, wherein
the requested display page comprises
the retrieved realtime information, and
the cached non-realtime information.

9. The method of claim 1, wherein
the realtime information comprises information that is displayable without using the computation for generating the realtime information prior to being displayed.

10. A computer system comprising:
a component configured to receive a request from a user to generate a requested display page, wherein
the requested display page comprises
realtime information, and
non-realtime information,
a component configured to retrieve information specific to the user to be included on the requested display page;
a component configured to retrieve realtime information to be included on the requested display page, wherein
the realtime information comprises
information displayable without computation to generate the realtime information prior to display;
a component configured to request non-realtime information to be included on the requested display page and to cache the generated non-realtime information, wherein
the non-realtime information comprises
information requiring computation to generate the non-realtime information prior to display;
a component configured to,
if a cached version of the non-realtime information is available,
generate the requested display page comprising
wherein
the requested display page comprises
the realtime information, and
the cached non-realtime information,
request generation of the non-realtime information, wherein
the request of the generation is performed subsequent to the generation of the requested display page, and
the generation of the non-realtime information produces generated non-realtime information, and
cache the generated non-realtime information as cached generated non-realtime information, wherein
the cached generated realtime information is configured to be used when generating another instance of the requested display page in response to a subsequent request for the requested display page,
and wherein
the component is configured to request the generation of the non-real-time information be performed if,
the previously cached version of the non-real-time information is available, or
the previously cached version of the non-real-time information is not available; and
a component configured to send to a user computer system the requested display page for display to a user.

11. The computer system of claim 10 wherein the request to generate the requested display page is received from the user.

12. The computer system of claim 10 wherein the request to generate the requested display page is received when the user logs on to one of the computer system and a client coupled to the computer system.

13. The computer system of claim 12 wherein the requested display page is a homepage.

14. The computer system of claim 10 wherein the generated information includes a graphical representation of the business information.

15. The computer system of claim 10 further comprising:
a component configured to drill down to view underlying information used to generate a selected portion of the requested display page, in response to a request selecting the selected portion of the requested display page, wherein the drilling down comprises
retrieving the underlying information used to generate the selected portion of the requested display page, and
presenting the underlying information by virtue of one of
generating the requested display page comprising the realtime information, the non-realtime information, and the underlying information, and
generating a new display page comprising the underlying information.

16. The computer system of claim 10, further comprising: a component configured to,
if a cached version of the non-realtime information is not available,
generate the requested display page, wherein
the requested display page comprises
the retrieved realtime information, and
an indication that the non-realtime information is not yet ready for display, and
the indication that the non-realtime information is not yet ready for display is provided in a location in which the non-realtime information is to be displayed,
request generation of the non-realtime information,
cache the generated non-realtime information, and
generate the requested display page in response to a subsequent request for the requested display page, wherein
the requested display page comprises
the retrieved realtime information, and
the cached non-realtime information.

17. The computer system of claim 16 wherein the component configured to generate the requested display page comprises an indication that the non-realtime information is not yet ready for display is further configured to include a link for requesting the requested display page.

18. A computer-readable storage medium comprising program instructions executable to:
receive a request from a user to generate a requested display page, wherein
the requested display page comprises
realtime information, and
non-realtime information,
the realtime information comprises
information displayable without computation to generate the realtime information prior to display, and
the non-realtime information comprises
information requiring computation to generate the non-realtime information prior to display;
retrieve the realtime information to be included on the requested display page;
if a previously cached version of the non-realtime information is available,
generate the requested display page, wherein
the requested display page comprises
the retrieved realtime information, and
the previously cached non-realtime information,
request generation of the non-realtime information, wherein
the request of the generation of the non-realtime information is performed subsequent to the generating the requested display page, and
the generation of the non-realtime information produces generated non-realtime information, and
cache the generated non-realtime information as cached generated non-realtime information, wherein
the cached generated realtime information is configured to be used when generating another instance of the requested display page in response to a subsequent request for the requested display page; and
if a previously cached version of the non-realtime information is not available,
generate the requested display page,
request the generation of the non-realtime information, and
cache the generated non-realtime information,
and wherein
the requesting of the generation of the non-real-time information is performed if
the previously cached version of the non-real-time information is available, or
the previously cached version of the non-real-time information is not available.

19. The computer-readable storage medium of claim 18, wherein the program instructions are further executable to:
drill down to view underlying information used to generate a selected portion of the requested display page, in response to a request selecting the selected portion of the requested display page, wherein the drill down instructions comprise further instructions to
retrieve the underlying information used to generate the selected portion of the requested display page, and
present the underlying information by virtue of one of
generating the requested display page comprising the realtime information, the non-realtime information, and the underlying information, and
generating a new display page comprising the underlying information.

20. The computer-readable storage medium of claim 18, wherein
the requested display page, generated if a previously cached version of the non-realtime information is not available, comprises
the retrieved realtime information, and
an indication that the non-realtime information is not yet ready for display, and
the indication that the non-realtime information is not yet ready for display is provided in a location in which the non-realtime information is to be displayed.

21. The computer-readable storage medium of claim 18, wherein
wherein the program instructions are further executable to, if a previously cached version of the non-realtime information is not available:
generating the requested display page in response to a subsequent request for the requested display page, wherein
the requested display page comprises
the retrieved realtime information, and
the cached non-realtime information.

22. A method in a computer system, the method comprising:
receiving a request from a user to generate a requested display page, wherein
the requested display page comprises
realtime information, and
non-realtime information,
the realtime information comprises
information displayable without computation to generate the real time information prior to display, and
the non-realtime information comprises
information requiring computation to generate the non-real-time information prior to display; and retrieving the realtime information to be included on the requested display page;
generating the requested display page, wherein
the requested display page comprises
the retrieved realtime information, and
the previously cached non-realtime information,
requesting generation of the non-realtime information, wherein
the requesting of the generation is performed subsequent to the generating the requested display page, and
the generation of the non-realtime information produces generated non-realtime information, and
caching the generated non-realtime information as cached generated realtime information, wherein
the cached generated realtime information is configured to be used when generating another instance of the requested display page in response to a subsequent request for the requested display page;
and wherein
the requesting of the generation of the non-real-time information is performed if,
the previously cached version of the non-real-time information is available, or
the previously cached version of the non-real-time information is not available.

23. The method of claim 22 wherein the request to generate the requested display page is received when the user logs on to one of the computer system and a client coupled to the computer system.

24. The method of claim 23 wherein the requested display page is a homepage.

25. The method of claim 22 wherein the generated information includes a graphical representation of information.

26. The method of claim 22 further comprising:
drilling down to view underlying information used to generate a selected portion of the requested display page, in response to a request selecting the selected portion of the requested display page, wherein the drilling down comprises
retrieving the underlying information used to generate the selected portion of the requested display page, and
presenting the underlying information by virtue of one of
generating the requested display page comprising the realtime information, the non-realtime information, and the underlying information, and
generating a new display page comprising the underlying information.

27. The method of claim 22 wherein
the requested display page, generated if a previously cached version of the non-realtime information is not available, comprises
the retrieved realtime information, and
an indication that the non-realtime information is not yet ready for display, and
the indication that the non-realtime information is not yet ready for display is provided in a location in which the non-realtime information is to be displayed.

28. The method of claim 22 wherein
the generating the requested display page, if a previously cached version of the non-realtime information is not available, further comprises
generating the requested display page in response to a subsequent request for the requested display page, wherein
the requested display page comprises
the retrieved realtime information, and
the cached non-realtime information.

29. The method of claim 22, wherein
the realtime information comprises information that is displayable without using the computation for generating the realtime information prior to being displayed.

30. A method in a computer system, the method comprising:
receiving a request from a user to generate a requested display page, wherein
the requested display page comprises
realtime information, and
non-realtime information,
the realtime information comprises
information displayable without computation to generate the real time information prior to display, and
the non-realtime information comprises
information requiring computation to generate the non-real-time information prior to display; and
if a previously cached version of the non-realtime information is not available,
generating the requested display page
requesting the generation of the non-realtime information, and
caching the generated non-realtime information,
and wherein
the requesting of the generation of the non-real-time information is performed if,
the previously cached version of the non-real-time information is available, or
the previously cached version of the non-real-time information is not available.

31. The method of claim 30 wherein the request to generate the requested display page is received when the user logs on to one of the computer system and a client coupled to the computer system.

32. The method of claim 31 wherein the requested display page is a homepage.

33. The method of claim 30 wherein the generated information includes a graphical representation of information.

34. The method of claim 30 further comprising:
drilling down to view underlying information used to generate a selected portion of the requested display page, in response to a request selecting the selected portion of the requested display page, wherein the drilling down comprises
retrieving the underlying information used to generate the selected portion of the requested display page, and
presenting the underlying information by virtue of one of
generating the requested display page comprising the realtime information, the non-realtime information, and the underlying information, and
generating a new display page comprising the underlying information.

35. The method of claim 30 wherein
the requested display page, generated if a previously cached version of the non-realtime information is not available, comprises
the retrieved realtime information, and
an indication that the non-realtime information is not yet ready for display, and
the indication that the non-realtime information is not yet ready for display is provided in a location in which the non-realtime information is to be displayed.

36. The method of claim 30 wherein
the generating the requested display page, if a previously cached version of the non-realtime information is not available, further comprises
generating the requested display page in response to a subsequent request for the requested display page, wherein
the requested display page comprises
the retrieved realtime information, and
the cached non-realtime information.

37. The method of claim 30, wherein
the realtime information comprises information that is displayable without using the computation for generating the realtime information prior to being displayed.

\* \* \* \* \*